US012716549B2

(12) United States Patent
Posselt et al.

(10) Patent No.: US 12,716,549 B2
(45) Date of Patent: Aug. 25, 2026

(54) METHOD AND CONVEYING DEVICE

(71) Applicant: Linde GmbH, Pullach (DE)

(72) Inventors: Heinz Posselt, Pullach (DE); Anton Wellenhofer, Pullach (DE); Eva Müller, Pullach (DE); Stefan Felbinger, Pullach (DE); Christian Zach, Pullach (DE); Harald Zenz, Pullach (DE); Kathrin Wellenhofer, Pullach (DE); Hakemi Nabeel, Pullach (DE); Julia Kleiner, Pullach (DE); Petya Toneva, Pullach (DE); Kay Dost, Pullach (DE)

(73) Assignee: LINDE GMBH, Pullach (DE)

( * ) Notice: Subject to any disclaimer, the term of this patent is extended or adjusted under 35 U.S.C. 154(b) by 578 days.

(21) Appl. No.: 18/252,975

(22) PCT Filed: Nov. 11, 2021

(86) PCT No.: PCT/EP2021/025439
§ 371 (c)(1),
(2) Date: May 15, 2023

(87) PCT Pub. No.: WO2022/106053
PCT Pub. Date: May 27, 2022

(65) Prior Publication Data

US 2023/0417368 A1 Dec. 28, 2023

(30) Foreign Application Priority Data

Nov. 19, 2020 (EP) .................................... 20020547

(51) Int. Cl.
*F17C 5/02* (2006.01)

(52) U.S. Cl.
CPC ........ *F17C 5/02* (2013.01); *F17C 2205/0323* (2013.01); *F17C 2221/012* (2013.01);
(Continued)

(58) Field of Classification Search
None
See application file for complete search history.

(56) References Cited

U.S. PATENT DOCUMENTS 4,987,932 A 1/1991 Pierson
5,237,824 A 8/1993 Pawliszyn
(Continued)

FOREIGN PATENT DOCUMENTS

CA 3058444 A1 * 5/2020 ............. F17C 13/04
CN 107376418 A 11/2017
(Continued)

*Primary Examiner* — Jenna M Maroney
(74) *Attorney, Agent, or Firm* — Csaba Henter; MILLEN, WHITE, ZELANO & BRANIGAN

(57) ABSTRACT

A method for conveying a cryogen from a storage vessel to a load, comprising the following steps: a) introducing the cryogen from the storage vessel into a conditioning tank, the cryogen flowing from the storage vessel into the conditioning tank only because of the hydrostatic pressure of the cryogen, b) bringing the cryogen accommodated in the conditioning tank into its supercritical state, and c) discharging the cryogen from the conditioning tank to the load, wherein the cryogen accommodated in the conditioning tank is kept in the supercritical state during step c).

13 Claims, 4 Drawing Sheets

(52) U.S. Cl.
CPC ................. *F17C 2223/0161* (2013.01); *F17C 2223/033* (2013.01); *F17C 2225/0115* (2013.01); *F17C 2270/0105* (2013.01)

(56) References Cited

U.S. PATENT DOCUMENTS

| | | | | |
|---|---|---|---|---|
| 5,421,160 | A | 6/1995 | Gustafson | |
| 5,771,946 | A * | 6/1998 | Kooy | F17C 6/00 141/2 |
| 6,374,618 | B1 * | 4/2002 | Lak | F17C 11/005 62/7 |
| 9,683,702 | B2 | 6/2017 | Chang | |
| 2012/0060935 | A1 * | 3/2012 | Carter | F02D 19/023 137/511 |
| 2013/0263609 | A1 * | 10/2013 | Mackey | F17C 13/02 137/334 |
| 2014/0096539 | A1 * | 4/2014 | Gustafson | F17C 7/04 62/50.2 |

FOREIGN PATENT DOCUMENTS

| | | | | |
|---|---|---|---|---|
| DE | 60302768 | T2 | 8/2006 | |
| FR | 3061533 | A1 | 7/2018 | |
| KR | 20110090038 | A * | 8/2011 | F02M 21/0215 |
| WO | WO-2015000708 | A1 * | 1/2015 | F17C 13/007 |
| WO | WO-2015183966 | A1 * | 12/2015 | F17C 3/00 |
| WO | WO-2016172803 | A1 * | 11/2016 | F17C 7/04 |
| WO | WO-2025125690 | A1 * | 6/2025 | F17C 9/04 |

* cited by examiner

METHOD AND CONVEYING DEVICE

The invention relates to a method for conveying a cryogen and a conveying device for conveying a cryogen.

Storage vessels for liquid hydrogen can have a pressure-building vaporizer, according to the in-house know-how of the applicant, which makes it possible to build up a pressure within the storage vessel, so that gaseous hydrogen can be made available to a load, e.g., in the form of a fuel cell, with a stable supply pressure of approximately 6 bara. During operation of such a storage vessel in the maritime region, the natural movement due to the state of the sea can make it so that only with great difficulty can the operating conditions in the storage vessel be kept stable in such a way that the required supply pressure for the fuel cell can be kept constant.

The applicant is also aware of an in-house prior art in which the hydrogen is stored in the storage vessel in an approximately pressure-free manner. In this case, the hydrogen is conveyed using a cryogenic pump and supplied to the fuel cell with the previously mentioned supply pressure. However, such a cryogenic pump has moving parts, which can lead to a certain maintenance effort, and thus to operational downtimes. Furthermore, it is also possible according to internal findings to vaporize the hydrogen upstream of the fuel cell and then compress it in order to achieve the required supply pressure. However, this is unfavorable in terms of energy use.

Against this background, the object of the present invention is to provide an improved method for conveying a cryogen.

Accordingly, a method for conveying a cryogen from a storage vessel to a load is proposed. The method comprises the following steps: a) introducing the cryogen from the storage vessel into a conditioning tank, wherein the cryogen flows from the storage vessel into the conditioning tank only because of the hydrostatic pressure of the cryogen, b) bringing the cryogen accommodated in the conditioning tank into its supercritical state, and c) discharging the cryogen from the conditioning tank to the load, wherein the cryogen accommodated in the conditioning tank is kept in the supercritical state during step c).

Because the cryogen accommodated in the conditioning tank is kept in the supercritical state and therefore no phase boundary is present, a movement of the conditioning tank, e.g., in the case of high seas, does not have any adverse effects on the temperature distribution within the conditioning tank. Furthermore, the storage vessel can be operated at the lowest possible pressure. This extends the retention time of the cryogen.

The cryogen is preferably hydrogen. The terms, "cryogen" and "hydrogen," are therefore interchangeable as desired. In principle, however, the cryogen may also be any other cryogen. Examples of cryogenic fluids or liquids, or cryogens for short, in addition to the aforementioned hydrogen, are liquid helium, liquid nitrogen, or liquid oxygen. A "cryogen" is thus to be understood in particular as a liquid. The cryogen can also be vaporized and converted into the gaseous phase. After vaporization, the cryogen is a gas or can be referred to as gaseous or vaporized cryogen.

The load is preferably a fuel cell. In the present case, a "fuel cell" is understood to mean a galvanic cell that converts into electrical energy the chemical reaction energy of a continuously supplied fuel—in the present case, hydrogen—and of an oxidant—in the present case, oxygen. The cryogen is supplied to the load itself in particular in gaseous form, with a defined supply pressure. This means that the cryogen is vaporized before the load or upstream of the load. For example, the cryogen is supplied to the load with a supply pressure of 6 bara and a temperature of 10 to 25° C.

A gas zone and an underlying liquid zone are formed in the storage vessel after or during the cryogen filling operation. A phase boundary is provided between the gas zone and the liquid zone. After entering the storage vessel, the cryogen thus preferably has two phases with different aggregate states, viz., liquid and gaseous. The liquid phase can transition into the gaseous phase, and vice versa. A purely liquid filling operation is also possible.

To introduce the cryogen from the storage vessel into the conditioning tank, a line extending between the storage vessel and the conditioning tank is preferably provided. In this case, the storage vessel is preferably arranged, with respect to a direction of gravity, above the conditioning tank, so that the cryogen flows from the storage vessel into the conditioning tank solely due to the static pressure.

In the present case, the "hydrostatic pressure," "static pressure," "gravitational pressure," or "gravity pressure" is to be understood in particular as the pressure which occurs within a stationary fluid—in the present case, the cryogen—due to the influence of gravity or gravitational force. The fact that the cryogen flows or is conveyed from the storage vessel into the conditioning tank "only," "solely," or "just" because of the hydrostatic pressure of the cryogen means in particular that the cryogen is conveyed from the storage vessel into the conditioning tank "exclusively" by means of hydrostatic pressure. The terms, "only," "solely," "just," or "exclusively," are accordingly interchangeable as desired. "Exclusively" means in particular that there is no other type of conveying of the cryogen except on the basis of its hydrostatic pressure. "Flow" can in particular be replaced by "be conveyed."

This flow or conveying of the cryogen from the storage vessel to the conditioning tank solely because of its hydrostatic pressure can be achieved as mentioned above, for example, by virtue of the storage vessel, when viewed along a direction of gravity, being arranged, at least in sections, above or over the conditioning tank. In particular, a point or region at which the cryogen is discharged from or removed from the storage vessel is arranged higher than or above a point or region at which the cryogen is introduced into the conditioning tank or fed to it.

A pump for conveying the cryogen from the storage vessel into the conditioning tank is therefore not required, and therefore can be dispensed with. The method, and in particular step a) of the method, is accordingly carried out in a "pump-less" or "pump-free" manner. This means in particular that, in step a), the cryogen is introduced or conveyed from the storage vessel into the conditioning tank without a pump. Step a) can accordingly also be described as follows: pump-less introduction of the cryogen from the storage vessel into the conditioning tank. Dispensing with a pump leads to higher reliability of the method, because moving parts can be dispensed with.

After introducing the cryogen from the storage vessel into the conditioning tank, a valve provided between the storage vessel and the conditioning tank is preferably closed. The "supercritical state" or the "critical point" is to be understood as a thermodynamic state of the cryogen, which state is characterized by the matching of the densities of liquid and gaseous phases. The differences between the two aggregate states cease to exist at the critical point. That is, no phase boundary is present in the supercritical state.

The cryogen can, for example, be brought into the supercritical state by putting it under pressure. For example, heat can be introduced into the conditioning tank, so that the pressure in the conditioning tank rises. In particular, the pressure in the conditioning tank is increased exclusively by means of the introduction of heat. This means in particular that the cryogen is brought into the supercritical state only or exclusively by means of heat. The cryogen is held continuously or steadily in the supercritical state—in particular, during step c).

The product removal—in the present case, the removal of cryogen—takes place in the supercritical state of the cryogen. The pressure in the conditioning tank is thus steadily kept constant during the operation thereof. During step c), the cryogen is in particular always or constantly in a single-phase state, viz., in the supercritical state. “Always” means that leaving the supercritical state is not desired and, in particular, does not take place or cannot take place. This can be achieved, for example, by a continuous supply of heat during step c), i.e., while the cryogen is being removed from the conditioning tank.

During step c), the cryogen is preferably kept constantly in the supercritical state, so that the supercritical state is maintained even when the cryogen is discharged from the conditioning tank, while the load is supplied with the cryogen. This means in particular that, during step c), i.e., during the removal of the cryogen from the conditioning tank, heat is continuously introduced into the conditioning tank in order to keep the pressure in the conditioning tank constant during step c), so that the cryogen always remains in the supercritical state even while the cryogen is being discharged. The pressure in the conditioning tank is maintained—in particular, kept constant, and in particular exclusively by means of the introduction of heat.

According to one embodiment, after step a), the conditioning tank is separated from the storage vessel by means of a valve by the valve being closed.

The valve is preferably a shutoff valve. The valve may be an open-close valve. This means that the valve can be brought into two states, viz., into an open state and into a closed state. The aforementioned valve is provided in or on the line provided between the storage vessel and the conditioning tank.

According to a further embodiment, a valve provided between the conditioning tank, and the load is, in step c), opened.

A line which can be shut off via the aforementioned valve is likewise provided between the conditioning tank and the load. The valve is placed downstream of the conditioning tank.

According to a further embodiment, heat is introduced into the conditioning tank during step b) in order to bring the cryogen into the supercritical state.

For this purpose, a heating element may be provided in or on the conditioning tank. The heating element may, for example, be an electrical heating element. The heating element may also have a heating medium by means of which the heat is introduced into the cryogen.

According to a further embodiment, heat is introduced into the conditioning tank during step c) in order to keep the cryogen in the supercritical state.

This means that heat is continuously introduced into the cryogen during the emptying of the conditioning tank. As a result, the supercritical state can be maintained while the conditioning tank is being emptied.

According to a further embodiment, during step c), the density of the cryogen in the conditioning tank decreases. During the decrease in density, the cryogen is kept continuously in the supercritical state, and the load is supplied with the cryogen.

According to a further embodiment, during step c), a pressure within the conditioning tank is kept constant.

In the present case, “constant” can mean a deviation from a target pressure of ±1 bar. Preferably, the pressure within the conditioning tank is held to 14 bara.

According to a further embodiment, step c) is ended after a predetermined temperature is reached in the conditioning tank.

The predetermined temperature is, for example, −230° C. After the predetermined temperature has been reached, heat is preferably no longer introduced into the conditioning tank.

According to a further embodiment, the conditioning tank is decompressed into the load until a supply pressure of the load is reached.

The supply pressure is, for example, 6 bara. By the conditioning tank being decompressed into the load, the conditioning tank can be emptied further.

According to a further embodiment, the conditioning tank is decompressed into the storage vessel once the supply pressure is reached.

This means that, as soon as the pressure in the conditioning tank falls below the supply pressure, the cryogen is no longer supplied to the load, but instead to the storage vessel. In this case, the gaseous cryogen may be introduced into the storage vessel either from above, i.e., into a gas zone of the storage vessel, or laterally or from below, i.e., into a liquid zone of the storage vessel. In the latter case, at least partial condensation of the introduced gaseous cryogen in the storage vessel is possible.

According to another embodiment, a first conditioning tank and a second conditioning tank are operated intermittently.

For example, step a) is carried out with the first conditioning tank, while step b) or c) is carried out with the second conditioning tank. This makes it possible to supply a continuous flow of the cryogen to the load.

Furthermore, a conveying device for conveying a cryogen from a storage vessel to a load is proposed. The conveying device comprises a conditioning tank arranged between the storage vessel and the load, wherein the storage vessel and the conditioning tank are arranged such that the cryogen flows from the storage vessel to the conditioning tank only because of the hydrostatic pressure of the cryogen, wherein the conditioning tank is configured to bring cryogen introduced into the conditioning tank from the storage vessel into its supercritical state and to feed it to the load, and to keep the cryogen accommodated in the conditioning tank in the supercritical state while it is being supplied to the load.

The conveying device can comprise the storage vessel. The storage vessel is preferably rotationally symmetrical with respect to a center axis or axis of symmetry. The storage vessel is thus preferably cylindrical. The conditioning tank can also be cylindrical. The conditioning tank may also be referred to as a conditioning container. The fact that the conditioning tank is “configured to” bring the cryogen introduced into the conditioning tank into its supercritical state and feed it to the load means, in the present case, that the conditioning tank has means, e.g., a heating element or the like, by which the supercritical state can be reached. Means, e.g., in the form of the heating element mentioned above, are also provided for maintaining the supercritical state. For supplying the cryogen to the load, the conditioning tank has, for example, a line and a valve, or a line and a valve are assigned to the conditioning tank. In order to achieve the cryogen flowing from the storage vessel into the conditioning tank only or just because of its hydrostatic pressure, the storage vessel, when viewed along the direction of gravity, is preferably arranged or positioned at least partially to be higher than the conditioning tank.

According to one embodiment, the conditioning tank comprises a heating element for introducing heat into the cryogen accommodated in the conditioning tank, in order to bring the cryogen into the supercritical state.

The pressure in the conditioning tank can be increased by the introduction of heat. As a result, the cryogen is brought into the supercritical state.

According to a further embodiment, the conveying device further comprises a first conditioning tank and a second conditioning tank, wherein the first conditioning tank and the second conditioning tank are intermittently operable.

As mentioned above, it is thereby possible to supply a continuous flow of the cryogen to the load. Preferably, the load, as previously mentioned, is preceded by a vaporizer, which vaporizes the cryogen supplied to the load and thus brings it to a supply pressure of, for example, 6 bara at a temperature of 10 to 25° C. The vaporizer may, for example, be an electrical vaporizer. The vaporizer may also vaporize the cryogen using a heating medium.

According to a further embodiment, the conditioning tank is arranged, with respect to a direction of gravity, in such a way that the cryogen automatically flows into the storage vessel because of gravity.

As a result, when the cryogen is introduced from the storage vessel into the conditioning tank, it is possible to fill the conditioning tank into the storage vessel purely because of the static pressure of the cryogen. A pump with moving parts or the like can be dispensed with.

The embodiments and features described for the method apply accordingly for the proposed conveying device, and vice versa.

In the present case, "a(n)" is not necessarily to be understood as limiting to exactly one element. It is rather the case that several elements, such as two, three, or more, may also be provided. Any other numerical word used herein is also not to be understood as meaning an exact limitation to exactly the corresponding number of elements. Rather, numerical differences upwards or downwards are possible.

Further possible implementations of the method and/or the conveying device also include combinations that are not explicitly mentioned of features or embodiments described above or below with respect to the exemplary embodiments. A person skilled in the art will also add individual aspects as improvements or additions to the respective basic form of the method and/or of the conveying device.

Further advantageous embodiments of the method and/or of the conveying device are the subject matter of the dependent claims and of the exemplary embodiments of the method and/or of the conveying device described below. Furthermore, the method and/or the conveying device are explained below in more detail with reference to the accompanying figures based upon preferred embodiments.

In the figures, the same or functionally equivalent elements have been provided with the same reference signs unless otherwise indicated.

Figure 1:
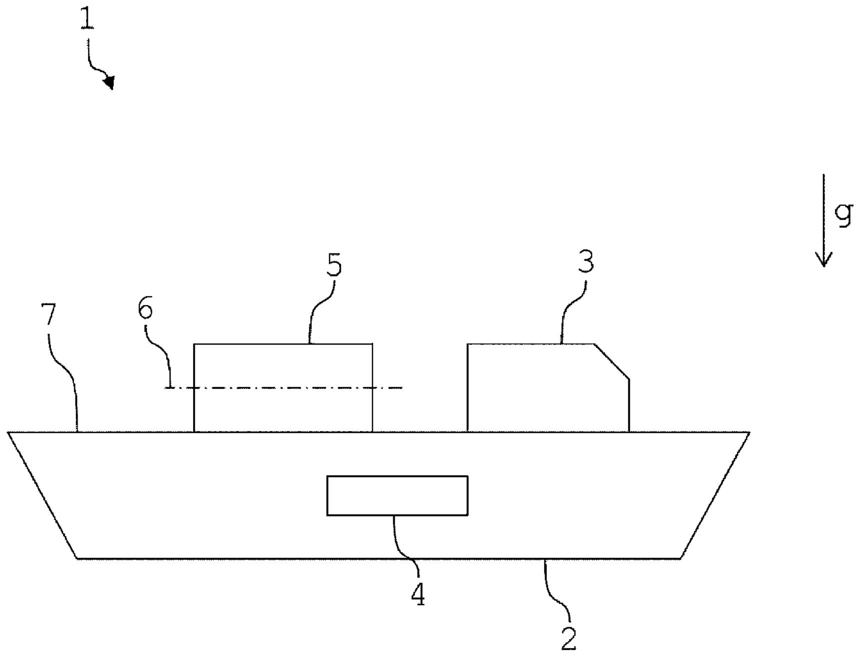
FIG. 1 is a schematic view of an embodiment of a vehicle.

FIG. 1 shows a highly simplified schematic side view of an embodiment of a vehicle 1. The vehicle 1 can, for example, be a maritime vessel, and in particular a ship. The vehicle 1 can be referred to as a maritime vehicle. In particular, the vehicle 1 can be a maritime passenger ferry. Alternatively, the vehicle 1 can also be a land vehicle or an aircraft. However, it is assumed below that the vehicle 1 is a vessel.

The vehicle 1 comprises a hull 2 that is buoyant. A bridge 3 is provided at or on the hull 2. The vehicle 1 is preferably powered by hydrogen. For this purpose, the vehicle 1 can have any load 4. The load 4 is preferably a fuel cell. In the present case, a "fuel cell" is understood to mean a galvanic cell that converts into electrical energy the chemical reaction energy of a continuously supplied fuel—in the present case, hydrogen—and of an oxidant—in the present case, oxygen. By means of the electrical energy obtained, an electric motor (not shown) can be powered, for example, which in turn drives a ship's screw for propelling the vehicle 1.

A storage vessel 5 for storing liquid hydrogen is provided for supplying the load 4 with hydrogen. For a stable operation of the load 4, it is necessary to supply the load 4 with gaseous hydrogen at a defined supply pressure. The storage tank 5 is rotationally symmetrical with respect to a center axis or axis of symmetry 6. The storage tank 5 can be arranged, for example, inside the hull 2, and in particular within an engine room, on the bridge 3, or on a deck of the hull 2, said deck acting as a foundation 7.

The axis of symmetry 6 can be oriented perpendicular to a direction of gravity g. This means that the storage vessel 5 is in a lying or horizontal position. The axis of symmetry 6 is thus parallel to the foundation 7. However, the storage vessel 5 can also be positioned upright or vertically. In this case, the axis of symmetry 6 is oriented parallel to the direction of gravity g. In the event that the vehicle 1 is, for example, a vehicle that has been converted to a hydrogen drive, the storage tank 5 can also be placed, for example, in a funnel or a stack of the vehicle 1.

In maritime applications, movement of the liquid hydrogen contained in the storage tank 5 caused by the state of the sea must be expected. In the case of a horizontally-arranged, cylindrical storage vessel 5, a sloshing of the liquid hydrogen over a large area is promoted by the mass inertia of the liquid hydrogen and the curvature, present due to the horizontal installation, of the storage vessel, both at its cylindrical outer wall and at its ends.

This sloshing, also known as swashing, leads to cooling of the gas phase above the liquid hydrogen and thereby to pressure reduction of a gas cushion formed above the liquid hydrogen. Depending upon the current state of the sea, this can have undesirable effects on the hydrogen supply pressure available for operating components of the load 4, which can lead to an unstable operation of the load 4.

In order to provide the supply pressure for the load 4, it is possible to use a liquid-cooled and liquid-embedded pump for pumping liquid hydrogen. However, such a pump has moving parts. In addition, in the case of intermittent operation of the pump, bubbles can form in the liquid hydrogen due to heating of the pump. This may lead to a malfunctioning of the pump. Alternatively, the hydrogen can first be vaporized and then brought to the necessary supply pressure using a compressor. However, this is unfavorable in terms of energy use.

Furthermore, the storage vessel 5 can also be operated directly at the supply pressure. In this case, an equilibrium with a liquid phase and a gas phase layered above the liquid phase is established in storage vessel 5. Due to the low surface tension of liquid hydrogen, a movement of the storage vessel e.g., when the latter is arranged on a vehicle 1 as mentioned above, leads to the liquid phase and the gas phase being mixed with one another, and the liquid hydrogen thereby cooling the warmer gaseous hydrogen. It is then not possible to maintain the supply pressure until an equilibrium is established between the temperature of the liquid hydrogen and the gaseous hydrogen.

Figure 2:
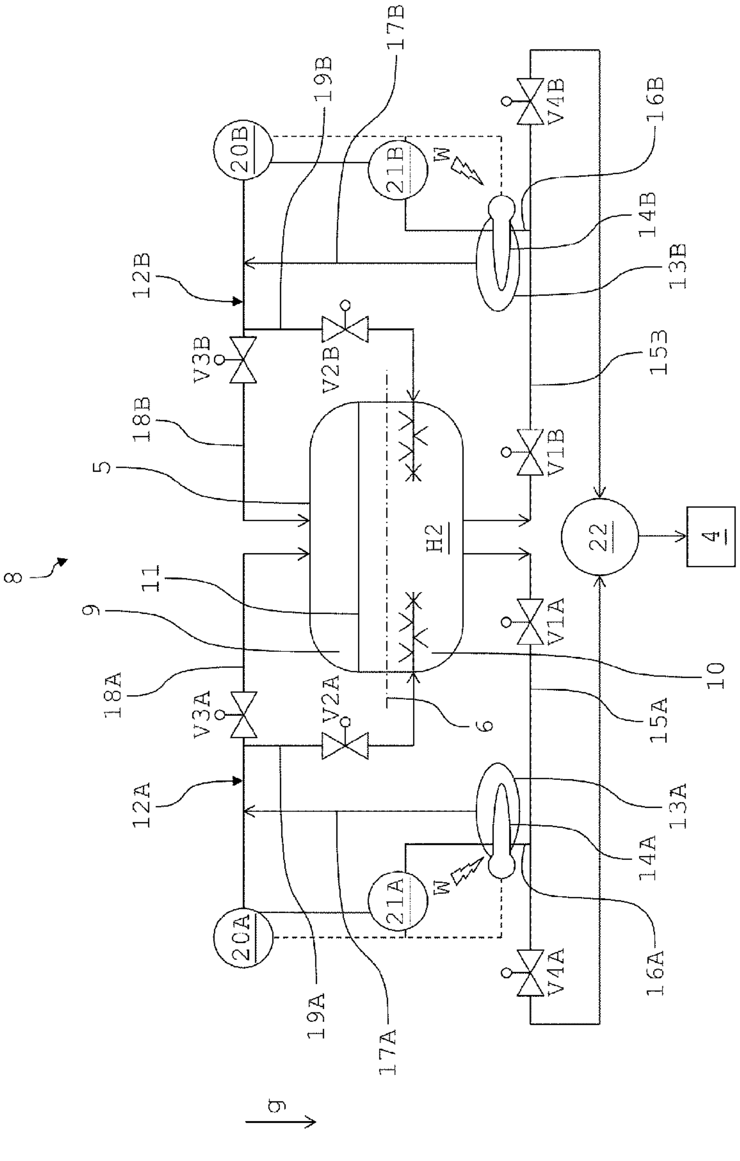
FIG. 2 is a schematic view of an embodiment of a conveying device for conveying hydrogen.

FIG. 2 shows a schematic view of an embodiment of a conveying device 8 which can have the storage vessel 5. Alternatively, the storage vessel 5 can also not be part of the conveying device 8. The conveying device 8 is configured to supply the load 4 continuously with gaseous hydrogen H2 at a constant supply pressure of approximately 6 bara, independently of the state of the sea or other movements of the storage vessel 5.

The storage tank 5 can also be referred to as a storage container. As mentioned above, the storage tank 5 is suitable for holding liquid hydrogen H2 (boiling point at 1 bara: 20.268 K=−252.882° C.). The storage vessel 5 can therefore also be referred to as a hydrogen storage vessel or as a hydrogen storage tank. However, the storage tank 5 can also be used for other cryogenic liquids. Examples of cryogenic fluids or liquids, or cryogens for short, are, in addition to the aforementioned liquid hydrogen H2, liquid helium He (boiling point at 1 bara: 4.222 K=−268.928° C.), liquid nitrogen N2 (boiling point at 1 bara: 77.35 K=−195.80° C.) or liquid oxygen O2 (boiling point at 1 bara: 90.18 K=−182.97° C.).

The liquid hydrogen H2 is accommodated in the storage vessel 5. As long as the hydrogen H2 is in the two-phase region, a gas zone 9 with vaporized hydrogen H2 and a liquid zone 10 with liquid hydrogen H2 can be provided in the storage vessel 5. After entering the storage vessel 5, the hydrogen H2 thus has two phases with different aggregate states, viz., liquid and gaseous. This means that, in the storage vessel 5, there is a phase boundary 11 between the liquid hydrogen H2 and the gaseous hydrogen H2.

The conveying device 8 comprises a conveying unit 12A, 12B. Preferably, two conveying units 12A, 12B, viz., a first conveying unit 12A and a second conveying unit 12B, are provided. It is also possible to provide exactly one conveying unit 12A, 12B. The conveying units 12A, 12B can be operated intermittently.

The conveying units 12A, 12B are constructed identically. The components of the first conveying unit 12A are denoted by the letter “A” in FIG. 2. The components of the second conveying unit 12B are denoted accordingly by the letter “B” in FIG. 2. Only the first conveying unit 12A is discussed below, wherein the explanations relating to the first conveying unit 12A are transferable accordingly to the second conveying unit 12B.

The first conveying unit 12A comprises a conditioning tank 13A which is suitable for accommodating hydrogen H2. The conditioning tank 13A can also be referred to as a conditioning container. With respect to the direction of gravity g, the conditioning tank 13A is placed below the storage vessel 5. The conditioning tank 13A has a heating element 14A for introducing heat W into the hydrogen H2. A line 15A leads from the storage vessel 5 to the conditioning tank 14. The line 15A opens out of a storage vessel 5 on the underside thereof. This means that the line 15A opens out of the storage vessel 5 below the phase boundary 11 so that liquid hydrogen H2 can be supplied to the conditioning tank 13A. The line 16A branches off from the line 15A towards the conditioning tank 13A.

Upstream of the line 16A, the line 15A comprises a valve V1A. The valve V1A is a shutoff valve. The valve V1A can be an on-off valve. The valve V1A is cold-resistant. This means that the valve V1A fulfills its valve function even at low temperatures—for example, at the boiling point of the hydrogen H2 of −252.882° C. For example, the valve V1A can be a solenoid valve or a shutoff valve. The valve V1A is preferably to be actuated automatically. Downstream of the line 16A, the line 15A comprises a valve V4A. The valves V1A, V4A can be constructed identically. The load 4 is positioned downstream of the valve V4A. This means that the line 15A leads to the load 4.

A line 17A leads upwards from the conditioning tank 13A counter to the direction of gravity g. The line 17A opens into a line 18A, which in turn opens into the storage vessel 5 on the upper side, i.e., above the phase boundary 11. The line 18A has a valve V3A. Valve V3A may be identical to valves V1A, V4A. Upstream of the valve V3A, a line 19A branches off from the line 18A and opens laterally into the storage vessel 5. The line 19A opens into the storage vessel 5 below the phase boundary 11. The line 17A has a valve V2A. The valve V2A can be identical to the valves V1A, V3A, V4A. The first conveying unit 12A further comprises a pressure controller 20A and a temperature controller 21A. A vaporizer 22 is connected upstream of the load 4. The vaporizer 22 can vaporize the hydrogen H2 electrically or using a heating medium.

Figure 3:
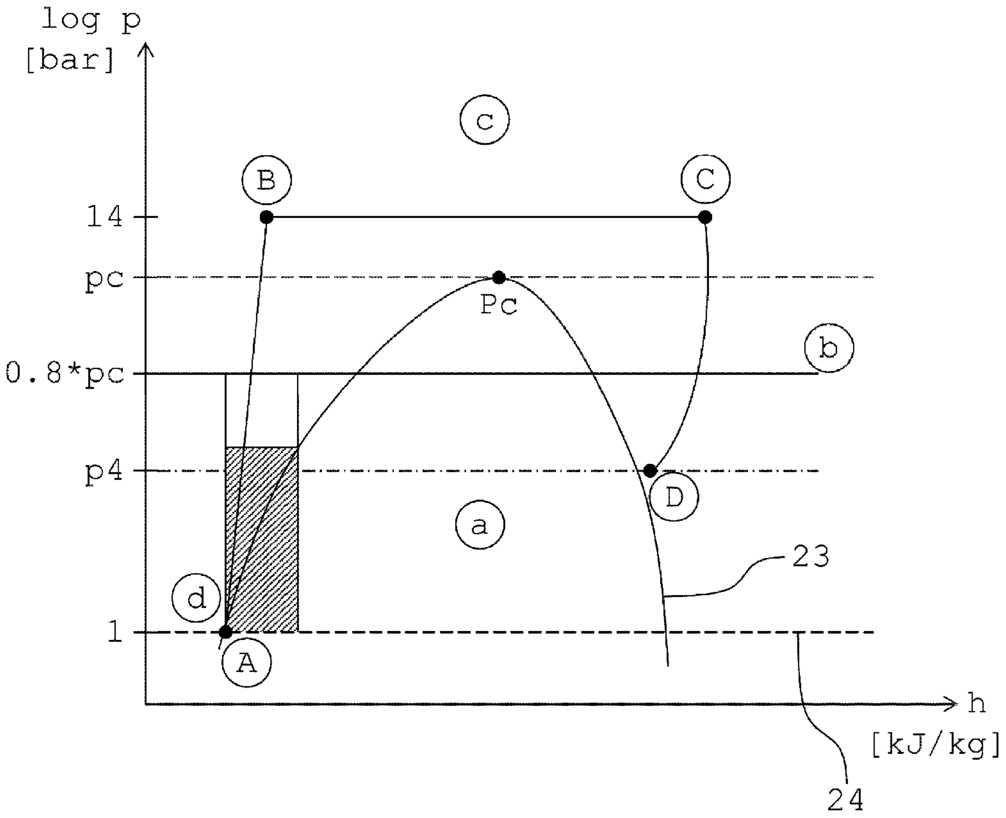
FIG. 3 is the pressure-enthalpy diagram of hydrogen.

The functionality of the conveying device 8 or the conveying units 12A, 12B is explained below with reference to the pressure-enthalpy diagram shown in FIG. 3. A pressure-enthalpy diagram is a state diagram with the specific enthalpy h on the abscissa axis and the pressure p on the ordinate axis. FIG. 3 shows a log-p-h diagram which logarithmically scales the pressure p. In FIG. 3, a denotes the two-phase region in which the gaseous and liquid phases of hydrogen H2 are present simultaneously. The pure gas phase is denoted by b. The supercritical range is denoted by c. The pure liquid phase is denoted by d.

FIG. 3 shows the two-phase line 23 with the critical point Pc. In thermodynamics, the critical point Pc is a thermodynamic state of a substance—in the present case, hydrogen H2—that is characterized by an equalization of the densities of the liquid phase and the gaseous phase. The differences between the two aggregate states cease to exist at the critical point Pc. Hydrogen H2 is then in its supercritical state. At the critical point Pc, the hydrogen H2 has a critical pressure pc of 12.3 bara and a critical temperature Tc of −239.9° C. The supply pressure p4 for the load 4 is approximately 6 bara.

Gaseous hydrogen H2 is initially located in the conditioning tank 13A. This can be decompressed either into a low-pressure system or into the storage vessel 5. For this purpose, the valves V1A, V2A, V4A are closed, and the valve V3A is opened. The gaseous hydrogen H2 is introduced into the gas zone 9 via the lines 17A, 18A. Alternatively, the valves V1A, V3A, V4A can also be closed, and the valve V2A can be opened. In this case, the gaseous hydrogen H2 is introduced into the liquid zone 10 via the lines 17A, 19A. The liquid hydrogen H2 in the storage vessel 5 then cools down the supplied gaseous hydrogen H2 so that it at least partially condenses.

Subsequently, the conditioning tank 13A is filled with liquid hydrogen H2 via the line 15A. For this purpose, the valves V2A, V3A, V4A are closed, and the valve V1A is open. Because the storage vessel 5 is placed above the conditioning tank 13A with respect to the direction of gravity g, the liquid hydrogen H2 automatically flows into the conditioning tank 13A because of the static pressure. The storage vessel 5 is completely or partially filled with liquid hydrogen H2. For example, the liquid hydrogen H2 in the storage vessel 5 or in the conditioning tank 13A at a point A has a pressure p of 1 bara, a temperature T of −253° C., and a density ρ of 71 kg/m$^3$. Point A is an intersection point of the two-phase line 23 with a 1-bar line 24.

The conditioning tank 13A is then isolated from the storage vessel 5 by means of closing the valve V1A. The valves V2A, V3A, V4A are still closed. By means of the heating element 14A, heat W is introduced into the liquid hydrogen H2 in order to increase the pressure p in the conditioning tank 13A. This is shown in FIG. 3 by a transition from point A to a point B. At point B, the pressure p is 14 bara, the temperature T is −251° C., and the density ρ is 71 kg/m$^3$. That is, the pressure p is higher than the critical pressure pc.

The temperature T is increased at the transition from point A to point B by 2° C. The hydrogen H2 in the conditioning tank 13A is now in the supercritical state. Because no phase boundary exists in the supercritical state, movements of the conditioning tank 13A, e.g., when at sea, do not have any adverse effects. The valve V4A is opened at the point B, and the hydrogen H2 is supplied to the load 4. The hydrogen H2 is vaporized using the vaporizer 22 and brought to the supply pressure p4 at a temperature T of 10 to 25° C.

The initial filling of the conditioning tank 13A is only a function of the temperature T. A fill-level measurement can be dispensed with. As previously mentioned, the hydrogen H2 is discharged to the load 4 via an opening of the valve V4A. The pressure p in the conditioning tank 13A is simultaneously maintained at a pressure p of 14 bara by further feeding of heat W. The degree of filling is purely a function of the temperature T. During the emptying and simultaneous heating of the conditioning tank 13A, the density ρ of the hydrogen H2 in the conditioning tank 13A decreases steadily via the emptying process of the conditioning tank 13A. The hydrogen H2 remains in the supercritical state as before. This means that the hydrogen H2 in the conditioning tank 13A is single-phase.

An excellent and fluctuation-free control of the hydrogen flow or the flow of hydrogen H2 from the conditioning tank 13A is thus possible. When the conditioning tank 13A is emptied, the single-phase process control does not result in a biphasic gas-liquid mixture in the conditioning tank 13A, which could in principle occur due to a pressure drop in the conditioning tank 13A. If a gas-liquid mixture forms in the conditioning tank 13A during the emptying thereof, this can lead to a discontinuous delivery of hydrogen H2 to the load 4. This takes place depending upon whether a discharge nozzle of the conditioning tank 13A is immersed into the gas phase or into the liquid phase of the hydrogen H2—for example, by sloshing of the liquid phase produced. However, this undesired, discontinuous delivery of hydrogen H2 is reliably avoided or at least significantly reduced by the single-phase process control.

The purely single-phase process control explained above is shown in FIG. 3 by a transition from point B to a point C. At the point C, the pressure p is 14 bara, the temperature T is −230° C., and the density ρ is 9.8 kg/m 3. During the transition from point B to point C, valve V4A remains open.

The temperature T is selected such that a significant drop in density ρ between points B and C takes place. This allows maximum use of hydrogen H2. The temperature T reached at the point C is a compromise between the maximum use of hydrogen H2 and a heat input into the storage vessel 5. If a certain temperature T is reached, the transfer of hydrogen H2 to the load 4 is stopped. The temperature T is maintained, and a certain pressure drop is allowed to further empty the conditioning tank 13A.

Alternatively, the introduction of heat W can be stopped, in order to reduce the temperature T in the conditioning tank 13A by an expansion of the supercritical hydrogen H2. This allows maximum use of hydrogen H2. This is shown in FIG. 3 by a transition from point C to a point D. At point D, the hydrogen H2 has the supply pressure p4 of 6 bara, a temperature T of −242° C., and a density ρ of 6.2 kg/m 3. At the point D, the valve V4A is closed, and the hydrogen H2, as explained in the introduction, is decompressed into the storage vessel 5. Use of hydrogen H2 of 92% can be achieved.

As already mentioned above, the conveying units 12A, 12B can be operated intermittently so that, for example, the first conveying unit 12A conveys the hydrogen H2 to the load 4, while the conditioning tank 13B of the second conveying unit 12B is, for example, being filled. This intermittent operation makes it possible to continuously supply the load 4 with hydrogen H2 at the required supply pressure p4.

The advantages of the conveying device 8 or the conveying unit 12A, 12B are summarized below. The hydrogen H2 in the storage vessel 5 can be held at its equilibrium, resulting in a long holding time of the hydrogen H2. It is sufficient to use, merely for mechanical reasons, conventional bulkheads or walls to prevent the sloshing. As a result, the storage vessel 5 can be constructed more easily. This results in a higher absorption capacity for the hydrogen H2.

The storage vessel 5 can be operated within a suitable pressure range of 1 to 6 bara. The density ρ of saturated liquid hydrogen H2 is pressure-dependent. An operation of the storage vessel 5 at the lowest possible pressure p is desirable. For example, the density ρ is 71 kg/m$^3$ at a pressure p of 1 bara, 60 kg/m$^3$ at a pressure p of 6 bara, and 28 kg/m$^3$ at a pressure p of 12 bara. Except for the valves V1A, V1B, V2A, V2B, V3A, V3B, V4A, V4B, the conveying device 8 has no moving parts. The conveying device 8 is therefore very impervious to faults.

The hydrogen H2 in the conditioning tank 13A, 13B can be kept in equilibrium. Walls or bulkheads for preventing the sloshing are required only when the conditioning tank 13A, 13B is operated at a pressure p of less than and preferably less than 0.9*pc. The hydrogen H2 can be removed from the conditioning tank 13A, 13B as a single-phase medium. The conveying device 8 can also be used under rough conditions, e.g., in heavy seas, because no phase transition between the gas phase and the liquid phase can take place which could lead to disturbed operation of the load 4.

A stable and interference-free operation of the load 4 is possible, because the hydrogen H2 can be removed from the conditioning tank 13A, 13B as a single-phase medium. A fill-level control of the conditioning tank 13A, 13B can be dispensed with, because, for example, a stop temperature can be set at point C, at which the supply of the load 4 is stopped. A simple pressure-temperature control scheme is possible using the heating element 14A, 14B. Because it is possible to introduce the gaseous hydrogen H2 directly into the liquid hydrogen H2 via the line 19A, 19B, an equilibrium can be quickly achieved in the storage vessel 5.

Figure 4:
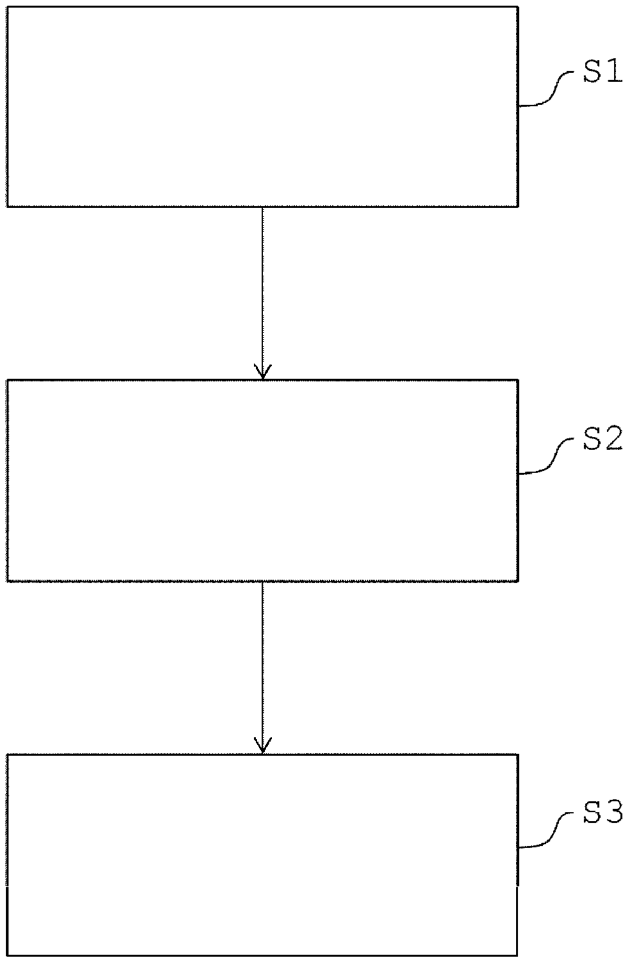
FIG. 4 is a schematic block diagram of an embodiment of a method for conveying hydrogen.

FIG. 4 shows a schematic block diagram of an embodiment of a method for conveying the hydrogen H2 using the conveying device 8. In a step S1, the hydrogen H2 is introduced from the storage vessel 5 into the conditioning tank 13A, 13B. For this purpose, the valves V1A, V1B are open. The valves V2A, V2B, V3A, V3B, V4A, V4B are closed. The hydrogen H2 is introduced into the conditioning tank 13A, 13B because of the static pressure of the hydrogen H2 accommodated in the storage vessel 5. For this purpose, the storage vessel 5 is placed, with respect to the direction of gravity g, above the conditioning tank 13A, 13B.

In a step S2, the hydrogen H2 accommodated in the conditioning tank 13A, 13B is brought into its supercritical state. For this purpose, the valves V1A, V1B are closed. By means of the heating element 14A, 14B, heat W is introduced into the conditioning tank 13A, 13B. The pressure p in the conditioning tank 13A, 13B rises until the supercritical state is reached.

In a step S3, the hydrogen H2 is conducted from the conditioning tank 13A, 13B to the load 4, wherein the hydrogen H2 accommodated in the conditioning tank 13A, 13B is kept in the supercritical state during step S3. For this purpose, during step S3, heat W is continuously introduced into the conditioning tank 13A, 13B. The valve V1A, V1B is open.

Although the present invention has been described with reference to exemplary embodiments, it can be modified in many ways.

REFERENCE SIGNS USED

1 Vehicle
2 Hull
3 Bridge
4 Load
5 Storage tank
6 Axis of symmetry
7 Foundation
8 Conveying device
9 Gas zone
10 Liquid zone
11 Phase boundary
12A Conveying unit
12B Conveying unit
13A Conditioning tank
13B Conditioning tank
14A Heating element
14B Heating element
15A Line
15B Line
16A Line
16B Line
17A Line
17B Line
18A Line
18B Line
19A Line
19B Line
20A Pressure controller
20B Pressure controller
21A Temperature controller
21B Temperature controller
22 Vaporizer
23 Two-phase line
24 1-bar line
a Two-phase region
A Point
b Gas phase
B Point
c Supercritical range
C Point
d Liquid phase
D Point
h Enthalpy
H2 Hydrogen/cryogen
p Pressure
pc Critical pressure
Pc Critical point
p4 Supply pressure
S1 Step
S2 Step
S3 Step
T Temperature
Tc Critical temperature
V1A Valve
V1B Valve
V2A Valve
V2B Valve
V3A Valve
V3B Valve
V4A Valve
V4B Valve
W Heat
ρ Density

The invention claimed is:

1. A method for conveying a cryogen from a storage vessel to a load, comprising:

a) introducing a liquid phase of the cryogen, which is hydrogen, helium, nitrogen or oxygen, from the storage vessel into a conditioning tank, wherein the cryogen flows from the storage vessel into the conditioning tank due to the hydrostatic pressure of the cryogen, b) bringing the cryogen accommodated in the conditioning tank above its critical pressure, wherein heat is introduced into the conditioning tank to bring the cryogen into its supercritical state, and c) discharging the cryogen from the conditioning tank to the load, wherein the cryogen accommodated in the conditioning tank is kept in its supercritical state during c), wherein heat is introduced into the conditioning tank to keep the cryogen in its supercritical state, and wherein the conditioning tank is decompressed into the load until a supply pressure of the load is reached.

2. The method according to claim 1, wherein, after a), the conditioning tank is separated from the storage vessel via a valve by closing the valve.

3. The method according to claim 1, wherein, in c), a valve provided between the conditioning tank and the load is opened.

4. The method according to claim 1, wherein, during c), the density of the cryogen in the conditioning tank decreases.

5. The method according to claim 1, wherein, during c), a pressure within the conditioning tank is kept constant.

6. The method according to claim 1, wherein c) is terminated after a predetermined temperature is reached in the conditioning tank.

7. The method according to claim 1, wherein the conditioning tank is decompressed into the storage vessel once the supply pressure is reached.

8. The method according to claim 1, wherein a first conditioning tank and a second conditioning tank are operated intermittently.

9. The method according to claim 1, which is performed in a conveying device for conveying the cryogen from the storage vessel to the load, the conveying device comprising:

the conditioning tank, which is arranged between the storage vessel and the load, wherein the storage vessel and the conditioning tank are arranged such that the cryogen flows from the storage vessel into the conditioning tank due to the hydrostatic pressure of the cryogen, wherein the conditioning tank is configured to bring the cryogen introduced from the storage vessel into the conditioning tank into a supercritical state and to feed the cryogen to the load, and to keep the cryogen accommodated in the conditioning tank in the supercritical state while the cryogen is being supplied to the load.

10. The method according to claim 9, wherein in the conveying device, the conditioning tank comprises a heating element for introducing heat into the cryogen accommodated in the conditioning tank to bring the cryogen into its supercritical state.

11. The method according to claim 9, wherein the conveying device further comprises a first conditioning tank and a second conditioning tank, wherein the first conditioning tank and the second conditioning tank are operable intermittently.

12. The method according to claim 9, wherein in the conveying device, the conditioning tank is arranged, with respect to a direction of gravity, such that the cryogen automatically flows into the storage vessel because of gravity.

13. The method according to claim 9, wherein in the conveying device, the conditioning tank comprises a heater for introducing heat into the cryogen accommodated in the conditioning tank to bring the cryogen into its supercritical state.

* * * * *